United States Patent
Baldi

(10) Patent No.: US 7,548,190 B2
(45) Date of Patent: Jun. 16, 2009

(54) OBSTACLE SENSOR OPERATING BY COLLIMATION AND FOCUSING OF THE EMITTED WAVE

(76) Inventor: Franco Baldi, Via Preneste, 8, 20148 Milan (IT)

( * ) Notice: Subject to any disclaimer, the term of this patent is extended or adjusted under 35 U.S.C. 154(b) by 0 days.

(21) Appl. No.: 11/999,082

(22) Filed: Dec. 4, 2007

(65) Prior Publication Data

US 2008/0142916 A1    Jun. 19, 2008

(30) Foreign Application Priority Data

Dec. 15, 2006    (IT)    .................. RE2006A00152

(51) Int. Cl.
  *G01S 13/93*    (2006.01)
  *G01S 7/28*    (2006.01)
(52) U.S. Cl. ...................... 342/175; 342/70; 342/55; 342/52
(58) Field of Classification Search ............ 342/70–72, 342/175, 52, 54, 55
  See application file for complete search history.

(56) References Cited

U.S. PATENT DOCUMENTS

| 5,991,474 | A | | 11/1999 | Baldi | |
|---|---|---|---|---|---|
| 6,018,308 | A | * | 1/2000 | Shirai | 342/70 |
| 6,163,252 | A | * | 12/2000 | Nishiwaki | 340/435 |
| 7,275,431 | B2 | * | 10/2007 | Zimmermann et al. | 73/510 |
| 2004/0183662 | A1 | * | 9/2004 | Baerenweiler et al. | 340/435 |
| 2007/0152804 | A1 | * | 7/2007 | Breed et al. | 340/435 |
| 2008/0142916 | A1 | * | 6/2008 | Baldi | 257/428 |
| 2008/0150786 | A1 | * | 6/2008 | Breed | 342/53 |
| 2008/0157940 | A1 | * | 7/2008 | Breed et al. | 340/425.5 |

FOREIGN PATENT DOCUMENTS

| CN | ZL 97120178.1 | | 8/2003 |
|---|---|---|---|
| EP | 427131 | A2 * | 5/1991 |
| EP | 0843182 | A2 | 5/1998 |
| IT | 1287826 | | 11/1996 |
| IT | 1297992 | | 10/1997 |

\* cited by examiner

*Primary Examiner*—John B Sotomayer
(74) *Attorney, Agent, or Firm*—Bucknam and Archer

(57) ABSTRACT

An obstacle sensor operating by collimation and focusing of the emitted wave comprises: a device (I) for insulating the electromagnetic waves emitted by a generator (1); a device for the automatic control (12, 12') of the transmitter and of the sensor status; a device (15'÷15''') for amplifying the power of the signals emitted and/or received; different shapes of output lens (14'÷14''') of the antenna, with or without peripheral lobes (16), associated or non associated to microwave sensors (19). The sensor is associable to passive and/or active obstacle warning reflectors with the possibility of discriminating them not only if front but also side and above and below the horizon central azimuth, for road, aircraft and naval applications.

13 Claims, 3 Drawing Sheets

OBSTACLE SENSOR OPERATING BY COLLIMATION AND FOCUSING OF THE EMITTED WAVE

Figure 1:
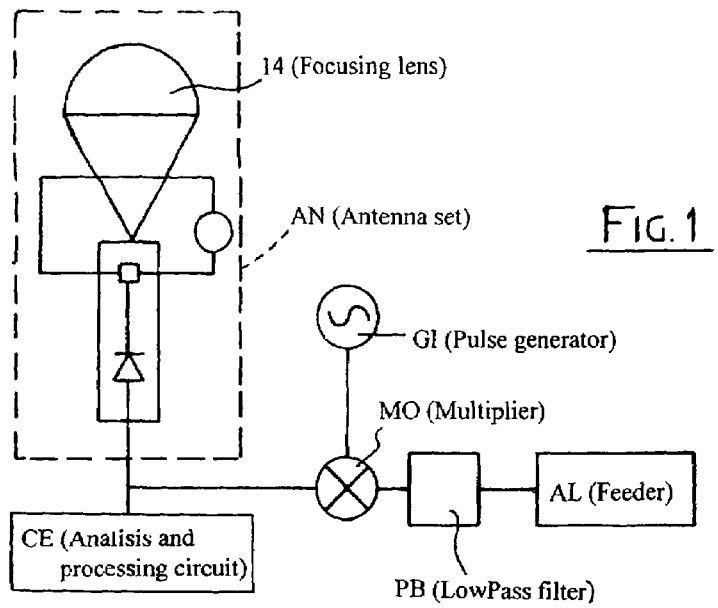

This invention relates to improvements to an obstacle sensor operating by collimation and focusing of the emitted wave, with the possibility of discriminating not only front obstacles but also side and above and below the horizon central azimuth.

The following have been granted to the name of the same Franco Baldi, applicant of Italian patents IT 1,287,826 of 18.11.1996 and IT 1,297,992 of 28.10.1997: a European patent EP 0843182A2, an American patent U.S. Pat. No. 5,991,474 and a Chinese patent ZL 97120178.1, relating to an "Obstacle sensor operating by collimation and focusing of the emitted wave".

Such obstacle sensor is substantially composed of a unit suitable for the generation and reception of electromagnetic radiations, which, is connected to a data analyzer/discriminator and an antenna suitable for the collimation and focusing of the transceived waves, which before sending the reflected waves to the receiving/transmitting part, performs thereon the same operations carried out on the transmitted waves. The sensor is substantially characterized in that it comprises, in coaxial order, a cavity of generation and selection of the waves emitted by a generating diode (such as for example a GUNN, IMPACT, TRANSISTOR, MAGNETRON diode), a polarization apparatus, a passive intermediate reflector and at least an optical apparatus of focusing and concentration of the waves emitted along the axis of an antenna. The optical apparatus constitutes the generation whole of a beam of concentrated, unipolar, coherent waves of the desired frequency and the maximum intensity and power, and the microwaves emitted by the antenna in the omnipolar direction are focused and concentrated in one only coherent beam and phased with the unidirectional reflected wave or echo obtained from sensing a still or moving obstacle, which is sensed by the same system and analyzed and quantified with respect to the typical behavior of the diode utilized as a microwave generator. In particular, the device relates to compact and solid state microwave and millimetric wave radars.

Various tests and applications have shown that while such configuration is highly effective, it can be further improved both as regards the signal power and as regards the focusing and concentration in only one coherent and phased beam of the microwaves emitted by the antenna in the omnipolar direction, and in the unidirectional reflected wave for sensing still or moving obstacles not only front but also side and above and below the horizon central azimuth.

In particular such improvements have the purpose of making the obstacle sensor operating by collimation and focusing of the emitted wave extremely versatile so as to use its features not only for front sensing of fixed and/or moving obstacles but also for front and side sensing, controls and guides for moving means of any kind: land, naval and air, and for self-regulating transmissions and receptions, with automatic and autonomous de-sensitization of the system, in the event of temperature and frequency shift, for reprogramming and correcting wrong parameters, for a more sophisticated behavior and in particular, for preventing the blinding of the system itself by possible electronic devices intended for neutralizing the operation thereof.

Further objects consist in the fact that besides guaranteeing the utmost effectiveness and safety, such improvements allow high exploitation thereof thanks to the simplicity, to the construction inexpensiveness and to the very small dimensions of the sensor.

Figure 2:
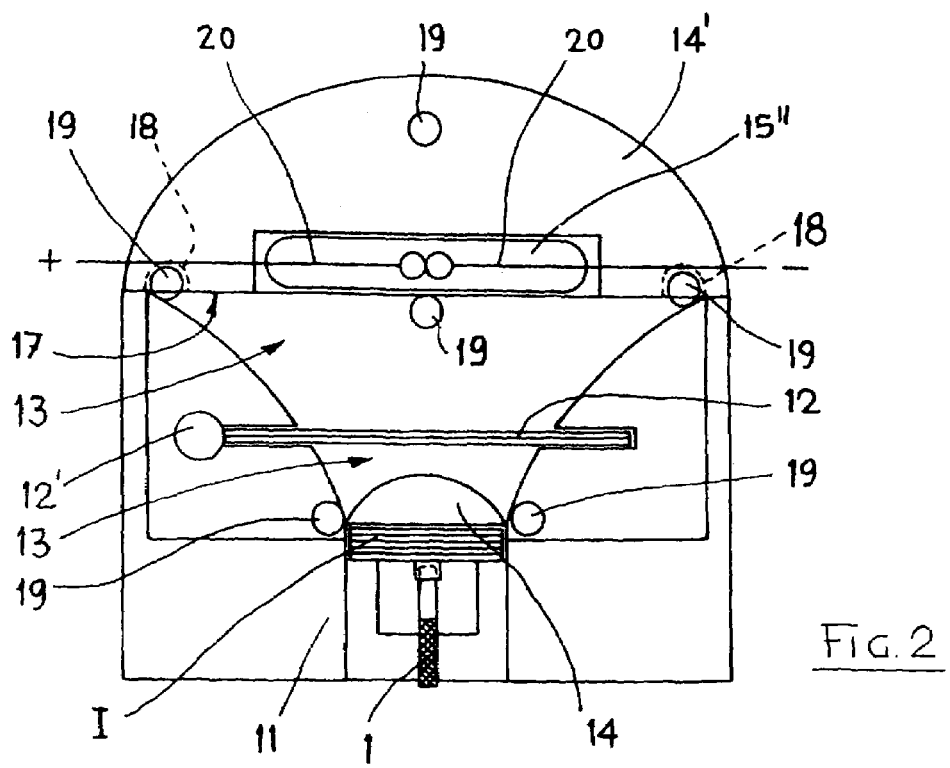
Figure 3A:
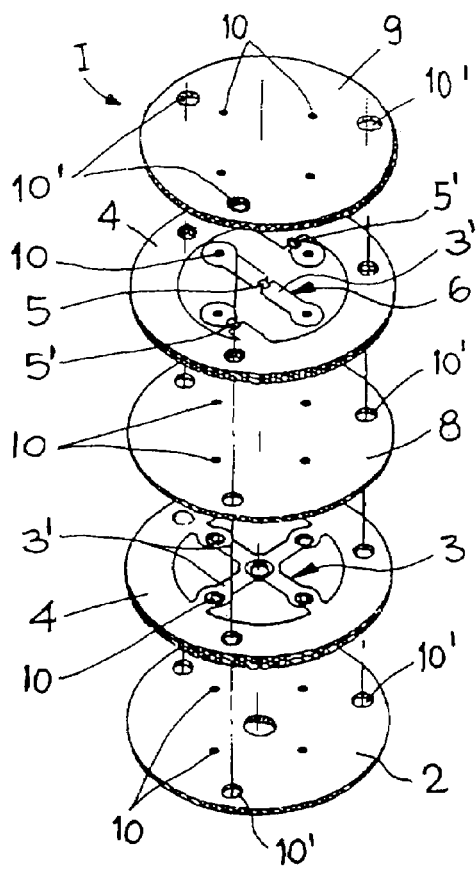
Figure 3B:
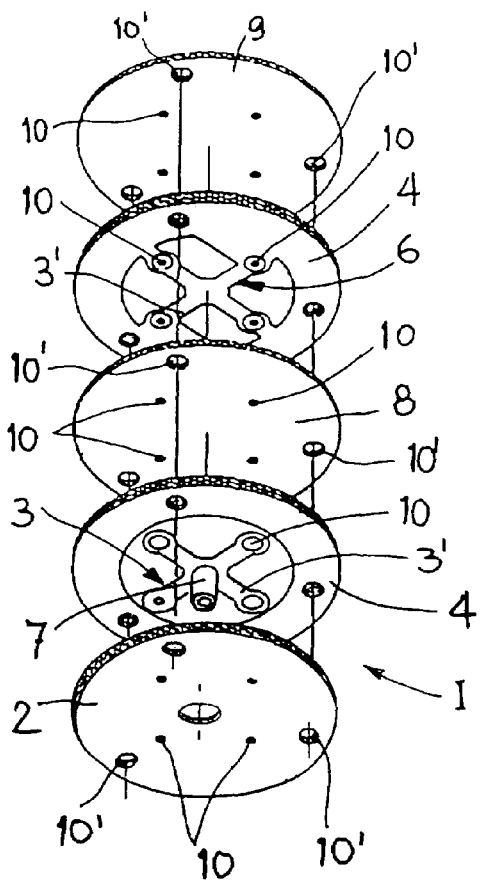
Figure 4A:
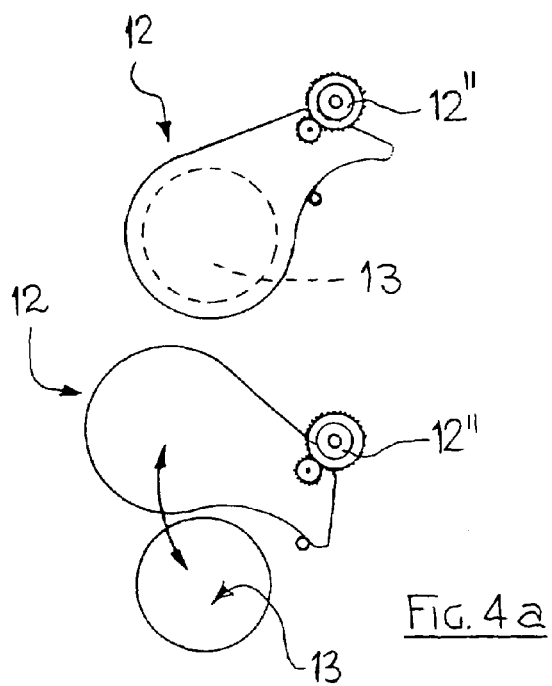
Figure 4B:
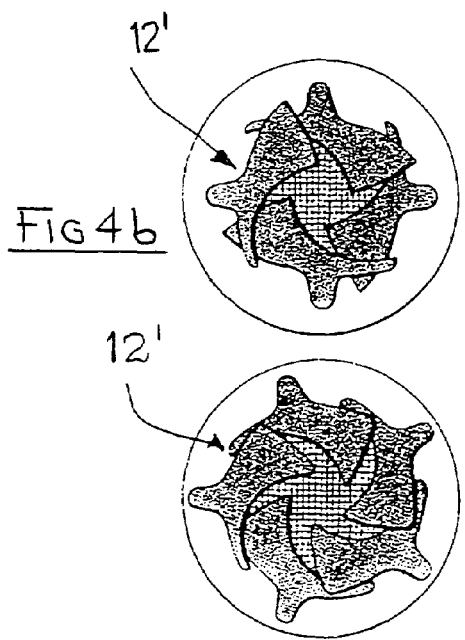
Figure 5:
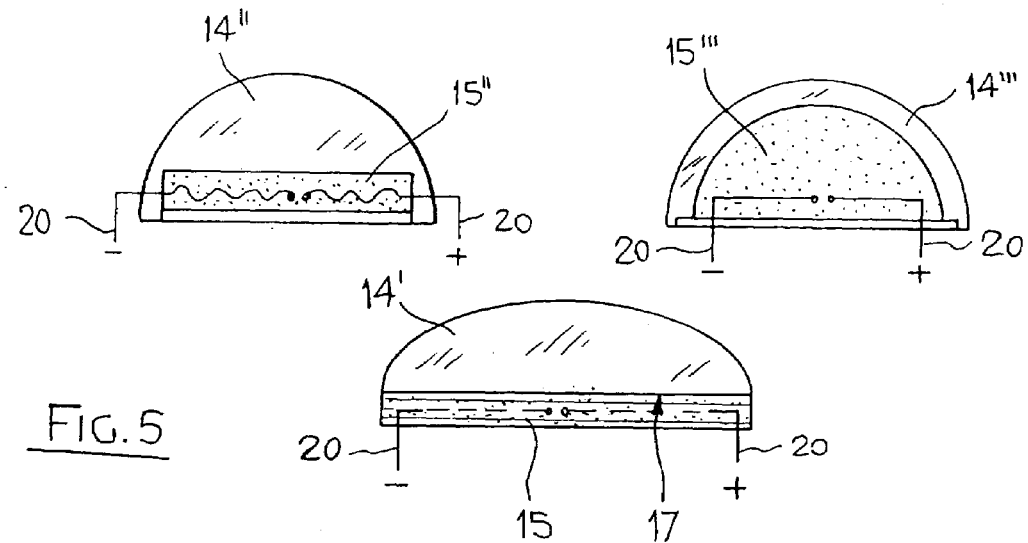
Figure 6:
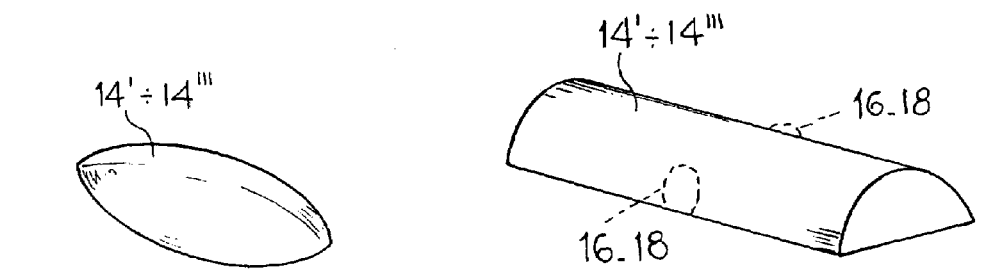
Figure 6:
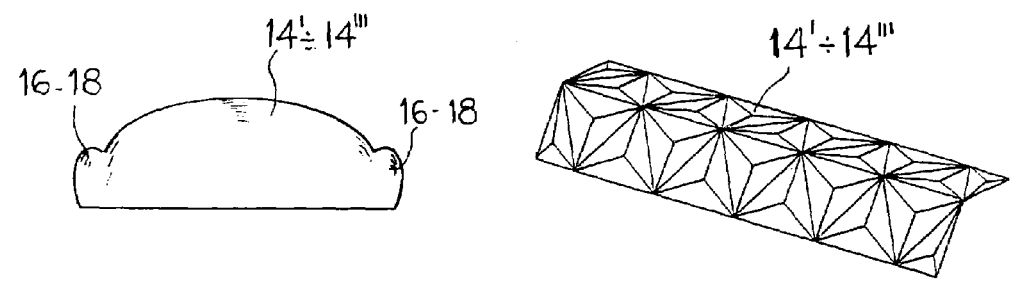
Figure 6:
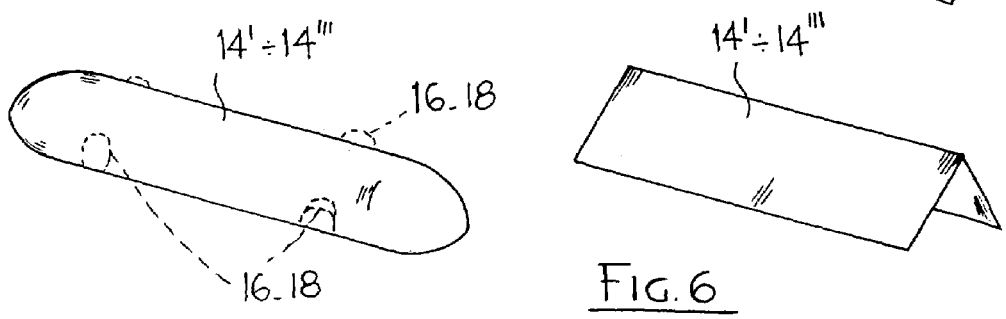

The invention is described in detail here below, according to typical configurations thereof given only by way of non-limiting example with reference to the attached drawings, wherein:

FIG. 1 shows the typical block diagram of an electronic circuit of data transmission and processing of the obstacle sensor, taken from the aforementioned granted patents, FIG. 2 shows a schematic cross section view of an embodiment of the sensor, wherein the improvements according to this invention are comprised, FIGS. 3 a and b show a perspective exploded view, from the bottom to top and vice versa, of a configuration of a device for insulating the electromagnetic waves emitted by a generator, according to this invention, FIGS. 4 a and b show a schematic plan view of examples of cyclical switches of the photographic type, with shutter and diaphragm, for controlling the action of transmission and sensing of obstacles, FIG. 5 shows some examples of configurations of the output lens of the obstacle sensor, associated to layers or means with electrical solid and/or fluid conductor materials, and FIG. 6 shows some examples of output lens shapes, with and without peripheral ovoid lobes.

With reference to the figures and to the typical block diagram of an obstacle sensor according to the aforementioned granted patents, wherein a feeder (AL), through a low-pass filter (PB) and a multiplier (MO) associated to a pulse generator (GI) connects, together with an analysis and processing circuit (CE), to an antenna set (AN), the improvements to the obstacle sensor operating by collimation and focusing of the emitted wave, object of this invention, essentially consist in:

A) A Device for Insulating the Electromagnetic Waves Emitted by a Solid State Microwave Generator, with Respect to Receivers of the Electromagnetic Waves of the Echo.

The generators are understood to be: GUNN, IMPACT, TRANSISTOR, MAGNETRON diodes or other solid state microwave generator components, in particular millimetric waves. For selective purpose of the reflected electromagnetic wave (echo), a first ground insulating layer (2) that couples with an obstacle (3) of conductive material, located on an insulating structure (4) is inserted in front of a generator (1); said obstacle (3), of known type, may be configured for example with radial extensions, or radiators (stripline), electrically powered, with multiple arms (3') X-shaped, radial, spiral, zigzag or other shape, arranged in length phase of ¼ wave or multiple of ¼ wave of the base generator frequency and all of said extensions (3') are fitted in said insulating material (4), transparent to microwaves and non-conductive, and are arranged at a minimum distance from each other by 1/32 of the defined wavelength.

The ends of the extensions (3') comprise holes (10) wherethrough the insulated electrical conductors pass, for central (5) and side (5') mixer sensors (detectors) arranged above a top barrier (6), also fitted into said material (4) for blocking the microwaves, connected to positive or negative ground and with a shape substantially corresponding to that of said obstacle (3), with similar extensions (3').

At the center of the bottom face of the obstacle (3), there is arranged an anodic stub (7) of ¼ wavelength, for feeding the generator (1) inserted therein. The obstacle (3) has the function of calibrating the predetermined frequency since the distance from the generator is equal to ¼ wave of the cavity at ½ wave, wherein it is placed. In overlapped aligned combination, a second insulating layer (8) is arranged between said obstacle (3) and said barrier (6) whereas said detectors or central (5) and side (5') mixer are arranged on the top surface of the barrier (6), where the central one and optionally also the side ones, is or are powered with independent rechargeable batteries in order to minimize both background and negative or positive ground molecular noise as much as possible. A further insulating layer (9) is overlapped to said barrier (6).

The layered planar set, insulator of the electromagnetic waves emitted by a generator (1): insulating (2), obstacle (3), insulating (8), barrier (6), insulating (9) is cylindrically configured shaped, like the containment cavity of the generator (1), so as to generate a circular polarization energy revolving about the support stub of the generator itself and coming out through said multiple arm planar "striplines" (3'). Along with the extensions (3') of the obstacle (3) and of the barrier (6), the insulator set (I) comprises equal and aligned through holes (10) on the insulating layers (4) for the passage of the electrical conductors, and through and aligned peripheral centering constraint and contact holes (10'), for setting to ground (negative or positive according to the circuit chosen) the electrical circuits that require such condition.

The antenna (AN) with the various components thereof, is enclosed in a grounded container (11), of non-magnetic stainless steel whose function is to prevent oxidations and external electromagnetic interferences.

With the presence of multiple arm (3') radiators or "striplines", suitably combined between said insulating layers (2, 8, 9), the emission of microwaves of the generator (1) does not impinge the detectors (5, 5') but passes behind a barrier. That is, the signals in output from the generator (1) are not disturbed by the presence of the detectors (mixer) but pass beyond the configurations of the radiators (3), advance, concentrate and upon the return thereof as obstacle signals, they are received orthogonally, both in the central and in the side zone (above and below) in the case of front obstacles, and are channeled by the lens in the central detector (5); otherwise, the return echoes are picked up by the side detectors (5'), in case also above or below the horizon line, if the obstacles are moved relative to the central impact zone;

B) A Device for the Automatic Control of the Transmitter and of the Obstacle Sensor Status.

It is a device for the cyclical interruption of the action of the obstacle sensor which, besides carrying out an automatic control of the transmitter and sensor status thereof, is capable of determining whether the beam of microwaves emitted and/or received has undergone temperature shifts and which, in that case, carries out an algorithmic parameter resetting through algorithmic-digital systems. The device is capable of self-desensitizing, so as to not undergo circuit block interferences by other radar devices or the like; it can be made in different ways: a) by mechanical systems of the type used on cameras, with shutter (12), diaphragm (12'), curtain or brushes and the like, with motor drive (12"); b) by an electronic layered system, where electrons are polarized so as to create a short circuit with liquid crystal techniques or electric or electrostatic ion discharges (gas dischargers); c) by a dielectric lens type system with ball or tubular revolving on its own axis which short circuits the output waves, which can have all the characteristics of focusing wherein a part is not transparent to microwaves; d) by a wave block system at a high magnetic or electromagnetic density, carried out by a piston that opens and closes at a front level of the detectors.

The device (12, 12') for the cyclical interruption of the obstacle sensor engages the passage area of the inner space of the intermediate passive reflector (13) just above the first dielectric focusing lens (14) and of concentration of the energy emitted by the generating diode (1) and is connected to an algorithmic-digital analysis microprocessor (CE).

Besides the automatic control of the transmitter and receiver status, the cyclical interruption of the obstacle sensor allows protecting its active action against any interference produced by other radars or the like;

C) A Device for Amplifying the Power of Signals Emitted and/or Received of the Obstacle Sensor.

On the lower flat part (17), or inside the lens (14', 14", 14''') made of dielectric or artificial dielectric material, of the antenna output there are arranged and constrained one or more layers (15') or a single block (15"), or for filling (15'''), or the like, of materials: solid, fluid, at the plasma state or gaseous at the liquid state or not, electrical conductors transparent to electromagnetic waves and having the intrinsic feature of charging with considerable energy if fed with high voltage electrical discharges, alternating or direct, or at pulses of various shape: square, triangular, or processed according to the temporal amplification needs, both in echo transmission and reception.

In the specific application, while said layers of electrical conductive materials, associated to the output lens of the antenna, comprise the effect of passive concentration, they have the function of generating an active effect that consists in an amplification of the power of signals emitted and/or received. The layers of electrical conductive materials, single or multiple or single block, associated to the respective electrodes (20) intended for producing the required high voltage electrical discharges, are directly applicable on the bottom surface (17) of the output lens (14') of the antenna, inside the same lens (14") if of the type with single or step-wise slots, inside the same lens (14''') if of the type with internal hemispherical chamber, and the like.

In the case shown in FIG. 2, the electrical conductive material is, for example, neon gas enclosed in an airtight bulb (15'). The electrodes (20) comprised in said layers of conductive materials are composed of thread-like spiral, coil circuits or with other arrangement, wherein the feeding high voltage that flows therein charges with energy, amplifying the radiating power thereof, the electromagnetic waves that come into contact relation with the same, both in output and in return;

D) Different Shapes of the Output Lens of the Obstacle Sensor Antenna.

The output lens (14', 14", 14''') of the antenna, besides hemispherical, may be with hemispherical sector, oblong, ovoid, ogive-like, parallelepiped with rounded edges, prismatic or multi-prismatic, or with other shapes and may comprise or not comprise ovoid lobes variedly oriented (16) associable to microwave detectors (19).

The various shapes of the output lens (14', 14", 14''') are conceived according to the type of application of the obstacle detector: if land, naval or air; that is, according to the type of convergence of the emitted and/or received waves, focused and concentrated in a point, orientated in horizontal or vertical, front or directional planes; the peripheral ovoid lobes (16) have the function of converging the waves emitted and/or received laterally as well. Moreover, and for ensuring and improving the transmission and reception of microwaves, also detectors (19) with suitable polarization system may be arranged peripherally to the base (17) of the antenna output lens, fitted therein, planar to the base or arranged in special cavities (18). The microwave sensors, in an indefinite number, may be located at any point and oriented in any arrangement of the antenna cavity; in particular along the edge where the energy concentrator dielectric lens (14) rests, in order to select electromagnetic waves coming from any direction.

In the substance, the above improvements are all aimed at improving the intrinsic features of the obstacle sensor operating by collimation and focusing of the emitted wave, guaranteeing the utmost safety and effectiveness thereof, simple and inexpensive application in the discrimination of low, medium and long range obstacles, in the most varied fields of application: automotive, railway, naval, aircraft, missile (without the possibility of being "blinded" by devices for jamming their direction), for automatic aiming systems and so on.

The sensor may be used alone or with multiple front and/or side units and may comprise systems for the automatic adjustment of the vector angle, in order to emit crossed microwaves capable of obtaining points of arrival and of detection of maximum amplitude and energy of the same microwaves added up, obtaining the maximum intensity of refraction therefrom. In the case of obstacle sensors with microwave detectors built therein with predetermined frequency generators, the algorithmic-digital data comparing systems process balanced circuits capable of detecting the space-time of transmission and reception of the reflected echo, with the possibility of detecting whether the obstacles themselves are front or side, above or below the horizon line; for this reason, the sensor is associated to a processor for sequential algorithms of the reflected "echo" energy that determines the phase/power unbalance of the microwave energy at stronger or weaker intensity sensed by the detectors and carries out the space-time discrimination of the occurrence of echo phase or pulse transmission for telemetry purposes. Increasing the number of detectors with gradient, it is possible to obtain the vector discrimination of obstacles, not just front and side but also in azimuth, above and below the horizon, relative to the central focus.

The obstacle sensor operating by collimation and focusing of the emitted wave according to the invention can be used alone or associated to other corresponding detectors. In this case the sensor can be arranged at the sides of the front of the means and positioned at suitable heights, for example: on motor vehicles they are applicable inside the housing of the headlights, with motors suitable for making them turn about their axes, in any direction. Another system for front and side sensing of the reflected echo is obtained placing in the vector center, between two side detectors, a third obstacle sensor provided with another transmitter device or with just a sensing diode and structured so as to follow the electromagnetic energy concentration lens principle. The side devices may have only the function of superdirective detectors with the possibility of being fitted with a microwave generator component with sensing diode coherent with the directive focusing characteristics of the waves received from the obstacles. Active or passive microwave detectors may be added in a suitable number, at the front, side and/or back on the vehicles, for detecting and signaling also emissions of waves from other electromagnetic sources. Moreover, it is possible to interfere with "push-pull", "on-off" electronic circuits communicating between radar systems having the same configuration and provided with suitable data processing circuits in order to interact by communicating with the respective circuits of other radar carriers. The above communication circuits between active and passive components may be placed on vehicles having installations corresponding to fixed or mobile installations applicable on roads, harbors, airports and other places wherein it is necessary to communicate electronically in order to have information useful for promoting safety devices. The sensor may be applied in several fields: for automotive use, with the function of light and/or sound danger signaling for the approach of fixed or mobile obstacles, front and/or side, still far away or not visible at sight; for airport use, with a series of active and/or passive multi reflectors located at suitable distances and inclinations both central and side, along take off or landing strips, allowing the aircrafts to be conveyed and to "cover" short landing and/or take off range corridors safely, or for sensing small obstacles, also wire-like such as electrical cables, cables of cableways and the like for the use of recreation and/or hunting airplanes and helicopters; for nautical use, with fixed port installations or mobile on ships, for all safety requirements due to poor visibility and/or limited maneuvering space; for railway use, with short, medium and long range detectors, capable of allowing the activation of the safety anti-collision and/or heeling means, in level crossings, front collisions, derailment or other unexpected obstacles on the rails; for spatial use, as approach means for alignment and coupling between satellite and spatial stations and spacecrafts; for military use, as miniature system for the location of missiles or aircraft mobile or fixed armours, also operating through clouds, fog; for the reception of satellite broadcasting, and radio/radio-television bridges, with reduction of the dimensions of high directive efficiency apparatus and parabolas; for general use coupled with passive or active microwave reflectors of various shapes and reflecting materials, with aligned and oblique projections, located in strategic points in roads, railway lines, bridges, airports, buildings, blind points in general.

The invention claimed is:

1. Improvements to an obstacle sensor operating by collimation and focusing of the emitted wave characterised in that they comprise:

A) a device for insulating the electromagnetic waves emitted by a solid state microwave generator, with respect to receivers, configured as a layered planar set (I) which comprises, in front of at least one generator of electromagnetic waves (1), a first ground insulator layer (2) coupled with an obstacle of conductive material (3) of known type, generically configured with radial extensions or planar "stripline" radiators with multiple arms (3') cross shaped, X shaped, radial, spiral, zigzag or other shape, electrically powered and arranged in length phase of ¼ wave or multiple of ¼ wave of the base generator frequency, said obstacle (3) being arranged on and in an insulating structure (4); said extensions (3') being fitted in said material (4), transparent to microwaves and non conductive, at a minimum distance from each other of 1/32 of the defined wavelength, whereas the respective ends comprise holes (10) wherethrough the insulated electrical conductors pass, for central (5) and side (5') mixer or detector sensors arranged on the upper part of a subsequent barrier (6) for blocking the microwaves, connected to positive or negative ground, with shape and features similar to those of said obstacle (3) and fitted in said material (4); at the center of the bottom face of said obstacle (3) there being inserted an anodic stub (7), of ¼ of wavelength, for feeding the generator (1) inserted therein, with the obstacle (3) that acts as calibrator of the predetermined frequency with distance from the generator (1) equal to ¼ wave of the cavity wherein it is received; in aligned overlapped combination, a second insulating layer (8) being arranged between said obstacle (3) and said barrier (6) whereas on the top surface of said barrier (6) there being arranged said central (5) and side (5') sensors, wherein the central one and optionally also the side ones is or are powered by an independent rechargeable battery, anti-noise for both background and molecular ones, coming from ground or from the circuit system; a third insulating layer (9) being overlapped to said barrier (6) and the layered planar set insulator (I): first insulating layer (2), obstacle (3), second insulating layer (8), barrier (6), third insulating layer (9) being substantially cylindrical like the containment cavity of the generator (1), based on the generation of a circular polarization energy, revolving about the support stub of the generator itself;

B) a device for the cyclical interruption of the action of the electromagnetic wave generator (1), for the automatic control of the transmitter and sensor status, associated to an algorithmic-digital processing (EC) for resetting the parameters of the possible temperature shifts of the beam of microwaves emitted and/or received from other devices external to the system; said device having the possibility of being: mechanical, of the type used on cameras: with shutter (12), diaphragm (12"), curtain or brushes, with electronic layer motor drive (12'), where the electrons are polarized in short circuit with liquid crystal techniques or electric or electro-static ion discharges (gas dischargers), of the dielectric ball lens type or tubular revolving on its own axis with short circuit of the output waves and characteristics of focusing partly not transparent to microwaves, of the wave block type at a high magnetic or electromagnetic density composed of a piston that opens and closes at a front level of the detectors; said device being applied in and through the intermediate passive reflector (13), just above the first lens (14) of the sensor operating by collimation and focusing of the emitted wave;

C) a device for amplifying the power of signals emitted and/or received from a generator (1), composed of one or more layers (15') or a single partial (15") or filling (15''') block of materials: solid, fluid, at the plasma state or gaseous at the liquid state or not, electrical conductors transparent to electromagnetic waves and having the intrinsic characteristic of charging with energy if fed with high voltage electrical discharges; said electrical conductive materials (15', 15", 15''') associated to said output antenna lens (14', 14", 14''') comprising the passive concentration effect and the generating function of an active effect consisting in an amplification of power of the signals emitted and/or received, and said electrical conductive materials, single or multiple or in a single block, associated to respective electrodes (20) suitable for producing the required high voltage electrical discharges, being directly applicable on the bottom surface (17) of the output lens (14') of dielectric or artificial dielectric material, of the sensor itself, inside the same lens (14") if of the type with simple or step-wise slots, inside the same lens (14''') if of the type with internal hemispherical chamber, and the like; and said electrical conductors (20), for feeding said layers of conductive materials, being thread-like spiral, coil or other layout circuits, wherein the feeding high voltage that flows therein charges with amplification energy of the radiating power the electromagnetic waves that come into contact relation therewith, both in the output and in the return phase;

D) antenna output lens (14'÷14'''), of dielectric or artificial dielectric material, with hemispherical, oblong, ovoid, ogive-like, parallelepiped with rounded edges shape or other rounded shapes comprising or not comprising generally ovoid peripheral lobes (16) associable to microwave sensors (detectors or mixers) (19); said various lens shapes (14'÷14''') being adopted on the basis of the type of convergence of the emitted and/or received waves focused and concentrated in a point, in front horizontal or vertical planes, or directional, and said lobes (16) being arranged on the basis of improving convergence of the emitted and/or received waves also on the side and being arranged peripherally and/or planar to the base (17) of the antenna output lens and/or associated to planar slots (18) comprising microwave sensing detectors or mixers (19) provided with suitable polarization system; said detectors or mixers (19), in any number, being arranged in any point and oriented in any arrangement of the cavity of the antenna; in particular on the edge where a dielectric lens (14) rests for energy concentration and selection of the electromagnetic waves coming from any direction.

2. Improvements to an obstacle sensor operating by collimation and focusing of the emitted wave according to claim 1 item A, characterised in that at least one electromagnetic wave generator (1) is composed of: GUNN, IMPAT, TRANSISTOR, MAGNETRON diodes or other solid state microwave generator components, in particular millimetric waves.

3. Improvements to an obstacle sensor operating by collimation and focusing of the emitted wave according to claim 1 item A, characterised in that said insulator planar layered set (I): first insulating layer (2), obstacle (3), second insulating layer (8), barrier (6), third insulating layer (9) is configured circular and comprises insulated through holes (10) for the conductors and peripheral holes (10') for centering and ground contact of the electrical circuits, and being comprised in a non-magnetic stainless steel container, for the insulation from noises coming from electromagnetic fields, and anti-oxidant insulation.

4. Improvements to an obstacle sensor operating by collimation and focusing of the emitted wave according to claim 1 item A, characterised in that said insulator planar layered set (I): first insulating layer (2), obstacle (3), second insulating layer (8), barrier (6), third insulating layer (9), is comprised in a non-magnetic stainless steel container and said radial extensions or planar "stripline" radiators with multiple arms (3') are such as to prevent the output signals from said generator (1) from being jammed by the presence of said central (5) and side (5') sensors or detectors but pass beyond the same planar "stripline" radiators with multiple arms (3'), advancing, concentrating and returning as obstacle signals, clear and centered.

5. Improvements to an obstacle sensor operating by collimation and focusing of the emitted wave according to claim 1 item B, characterised in that the device (12, 12') for the cyclical interruption of the obstacle sensor operates as automatic control of the transmitter and receiver status, excluding any interferences by other radars or the like from its active action.

6. Improvements to an obstacle sensor operating by collimation and focusing of the emitted wave according to claim 1 item B, characterised in that said device (12, 12') for the cyclical interruption of the obstacle sensor engages the passage area of the inner space of the intermediate passive reflector (13) just above said energy concentration dielectric lens (14) and is connected to an algorithmic-digital analysis microprocessor.

7. Improvements to an obstacle sensor operating by collimation and focusing of the emitted wave according to claim 1 item D, characterised in that said microwave sensors (19), in an indefinite number, are located at any point and oriented in any arrangement of the cavity comprising the energy concentration dielectric lens (14); in particular on the edge where the lens itself rests, with selection of the electromagnetic waves coming from any direction.

8. Improvements to an obstacle sensor according to claim 1, characterised in that it is adopted in the automotive field, with the function of light and/or sound hazard signaling for the approach of fixed or mobile, front and/or side, far away or not visible obstacles.

9. Improvements to an obstacle sensor according to claim 1, characterised in that it is used alone or with multiple front and/or side units, with or without systems for the automatic adjustment of the vector angle, for emissions of crossed microwaves in arrival points and for the detection of the maximum amplitude and energy of the same microwaves added up, and maximum intensity of refraction; the obstacle sensing can comprise built in microwave detectors with pre-determined frequency and fitted with balanced circuits capable of sensing the transmission and reception space-time of the reflected echo, associated to a processor of sequential algorithms of the reflected "echo" energy determining the unbalance of phase/power of the microwave energy at stronger or weaker intensity, sensed by the detectors; based on the number of detectors with gradient obtaining the vector discrimination of obstacles, not only front and side, but also in azimuth (above and below) relative to the central horizon focus.

10. Improvements to an obstacle sensor according to claim 1, characterised in that they can be used alone or associated to other corresponding sensors and are applicable to the sides of the front of the means and in positions at suitable heights, according to the specific applications.

11. Improvements to an obstacle sensor according to claim 1, characterised in that the front and side sensing of the reflected echo is constituted by placing a third obstacle sensor in the vector center between two side sensors, provided with another transmitting device or with a sensor only, structured so as to follow the electromagnetic energy concentration lens principle; the side devices having only the function of super-directive detectors with the possibility of being fitted with at least one microwave generator component with detector coherent with the directive focusing characteristics with respect to the waves received from the obstacles.

12. Improvements to an obstacle sensor according to claim 1, characterised in that they comprise multiple active or passive microwave detectors, front, side and back, for sensing and signaling of wave emissions coming from other electromagnetic sources and for interfering with "push-pull", "on-off" electronic circuits communicating between radar systems with the same conformation and provided with suitable data processing circuits with interaction and communication with the respective circuits of other radar carriers; the above communication circuits between active and passive components being placed on vehicles having installations corresponding to fixed or mobile installations applicable on roads, harbours, airports and other places wherein it is necessary to electronically communicate for safety devices.

13. Improvements to an obstacle sensor according to claim 1, characterised in that it is adopted in the discrimination of short, medium and long range obstacles, in the most varied fields of application: automotive, railway, naval, aircraft, missile, for automatic gun aiming systems, and so on.

* * * * *